Oct. 19, 1926.

J. O. HENSON 1,603,539

DADO SAW

Filed Oct. 26, 1925 — 2 Sheets-Sheet 1

INVENTOR
James O. Henson
BY
Frank Warren
ATTORNEY

Oct. 19, 1926.  
J. O. HENSON  
1,603,539  
DADO SAW  
Filed Oct. 26, 1925  
2 Sheets-Sheet 2
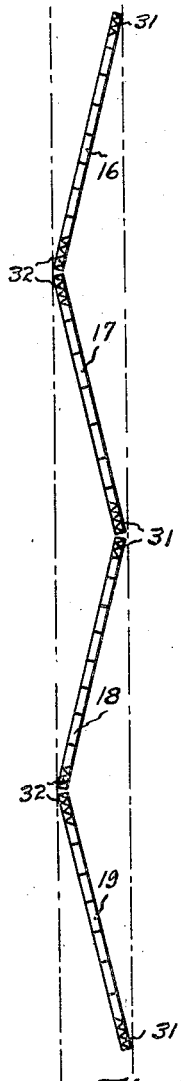
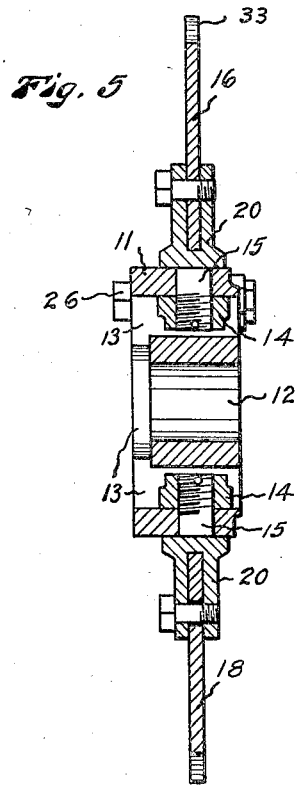
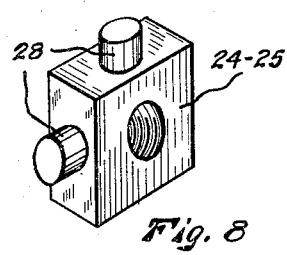
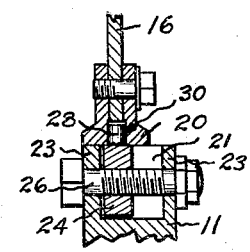
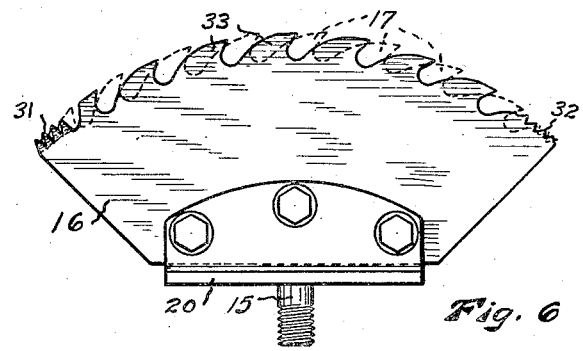
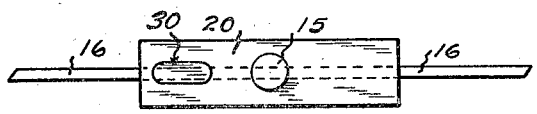
INVENTOR  
James O. Henson  
BY  
Frank Warren  
ATTORNEY Patented Oct. 19, 1926.

1,603,539

UNITED STATES PATENT OFFICE.

JAMES O. HENSON, OF SEATTLE, WASHINGTON.

DADO SAW.

Application filed October 26, 1925. Serial No. 64,789.

My invention relates to improvements in circular dado saws of the form that are adapted to be used for cutting grooves in wood, of greater width than an ordinary saw will cut and the object of my invention is to provide a rotary dado saw having a blade constructed of a plurality of relatively thin segments that are adapted to be adjusted at an angle to the medial plane of the saw so that when said saw is rotated on its axis the peripheries of said blades will make a cut of greater width than the thickness of the blades.

Another object is to provide efficient side cutters for a dado saw of this nature and to space and arrange the raker teeth so that they will clean all of the material out of the grooves when adjusted to cut maximum widths of grooves.

A further object is to provide a hub structure of novel and efficient construction for adjustably holding a plurality of circular saw segments in inclined positions.

Other and more specific objects will be apparent from the following description taken in connection with the accompanying drawings.

In the drawings Figure 1 is a view in side elevation of a dado saw constructed in accordance with my invention.

Fig. 5 is a sectional view on broken line 5—5 of Fig. 1.

Fig. 6 is a detached plan view of one of the saw segments.

Fig. 7 is a view of the bottom edge of the section shown in Fig. 6.

Fig. 8 is a detached isometric view of an adjusting block embodied in the invention.

Fig. 9 is a fragmentary sectional view substantially on 9—9 of Fig. 1.

Fig. 10 is a diagram illustrating a development of the periphery of a saw constructed in accordance with my invention as the same might appear if rolled out onto a flat surface.

Like reference numerals designate like parts throughout the several views.

Figure 1:
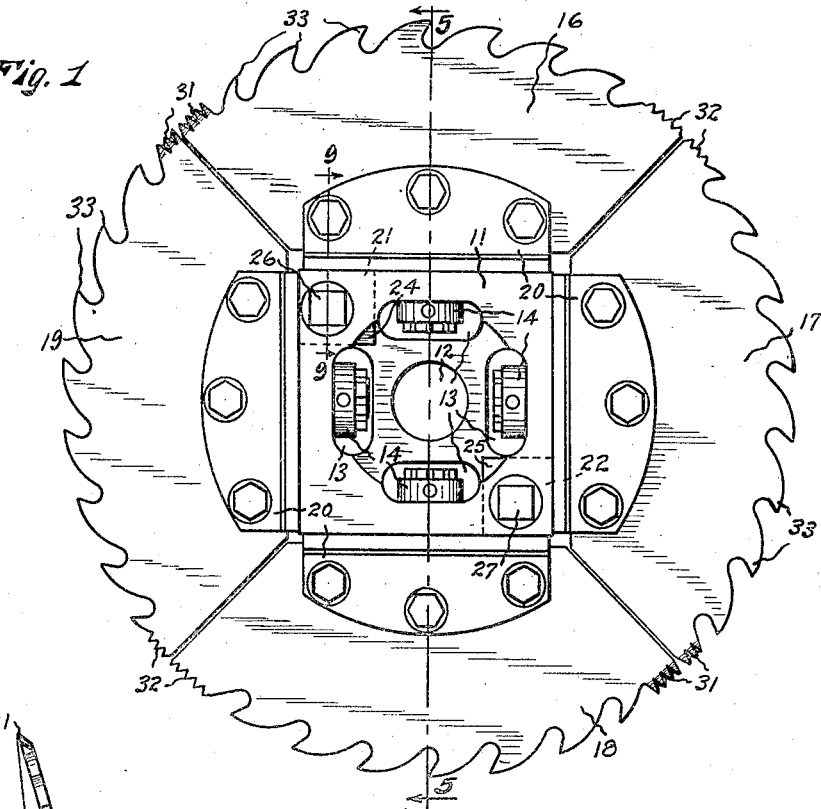
Figure 2:
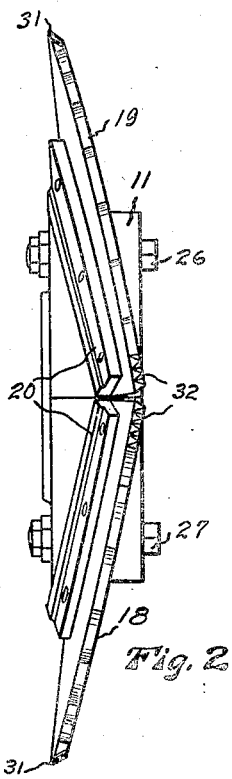
Fig. 2 is an edge view of the same showing the blade segments moved into an inclined position relative to the medial plane of the saw to produce a relatively wide cut.
Figures 3, 4:
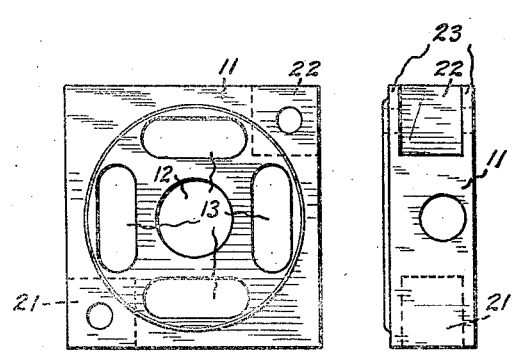
Fig. 3 is a detached view in side elevation of the center block or hub to which the blade sections are secured.
Fig. 4 is an edge view of said center hub.

In the drawings 11 designates a substantially square center block or hub having a centrally arranged bore 12 for the reception of an arbor, not shown, and having four symmetrically arranged transverse slots 13 for the reception of suitable nuts 14 that screw onto shanks 15 and serve to secure four saw segments 16, 17, 18 and 19 respectively to the square center block or hub 11. The shanks 15 may conveniently be made integral, or otherwise rigid, with respect to base blocks 20, which base blocks are bifurcated to receive the saw segments and have flat inner sides that bear squarely against the flat edges of the hub 11.

The hub 11 is provided on two diametrically opposite corners with rectangular notches or cut away portions 21 and 22 which extend inwardly from the edges of said hub 11 and have walls 23 on both sides thereof. The notches 21 and 22 are adapted to receive adjusting blocks 24 and 25 respectively, that are considerably narrower in width than the notches 21 and 22 and are adapted to be moved, within such notches, in a direction crosswise of the hub by transverse screws 26 and 27 respectively which are journaled in the walls 23 and are threaded through the blocks 24 and 25.

Each block 24 and 25 is provided with two integral stud pins 28 that project from two edges thereof at right angles to each other and are arranged to engage within slots 30 in the adjacent ends of two of the base blocks 20 that support the saw segments so that when the adjusting blocks 24 and 25 are moved sidewise relative to center hub 11 the base blocks 20 will pivot on shanks 15 and their angular position on the center hub will be changed. The nuts 14 are preferably locked onto the shanks 15 so that they will not be loosened by use or by adjustment of the saw segments.

The saw segments have arcuate peripheries which all cooperate to form a circular saw, each saw segment is provided at one end with side cutter teeth 31 beveled in one direction and at the other end with other side cutter teeth 32 beveled in the opposite direction, the teeth 31 at one end serving as side cutters for one side, and the teeth 32 at the other end serving as side cutters for the other side of a groove that is being made. The segments are each provided between the side cutter teeth 31 and 32 with raker teeth 33. The raker teeth 33 must necessarily be fairly close together and the raker teeth on alternate segments are positioned differently so that when the segments are adjusted at an angle relative to each other, the teeth of each segment will not exactly follow the teeth of the preceding segment but will be offset sidewise with respect to the corresponding preceding teeth to thereby insure the cutting away of all material when the angle of adjustment of the sections is great enough so that there would be an uncut strip left between adjacent teeth of the same section. This difference in the positioning of the teeth of alternate saw segments may be produced by providing different numbers of teeth on alternate sections or by beginning the first tooth of said alternate segments at different distances from the end of the segment so that if alternate segments are placed one upon another the points of the teeth of one will appear half way between the points of the teeth of the other as shown diagrammatically by the dotted lines in Fig. 6.

It will be noted that the pivots 15 are connected with the hub 11 to one side of the center so that when the segments are all adjusted into a common plane they will be nearer to one side than to the other of said hub.

This dado saw gives an infinite range of adjustments between the maximum and the minimum limits to which it is capable of being set. The saw is relatively simple in construction, easy to adjust, always in balance regardless of its adjustment and is efficient in its operation.

The foregoing description and accompanying drawings clearly disclose a preferred embodiment of my invention but it will be understood that this disclosure is merely illustrative and that such changes in the same may be made as are within the scope and spirit of the following claims.

I claim:

1. In a circular dado saw, a hub, a plurality of saw segments pivoted to said hub on axes that are radial relative to said saw and means connected with adjacent edges of said segments for rigidly holding said segments and for turning said segments on their pivots into adjusted angular positions.

2. In a dado saw, a hub, a plurality of saw segments pivotally secured to said hub and adjustable into various angular positions thereon and forming a single and substantially continuous cutting member throughout a complete circle, the edges of said segments being in close proximity to each other, smaller side cutter teeth at each end of each of said saw segments and larger raker teeth between said side cutter teeth.

3. In a dado saw, a square hub having four flat edges and having notches in said edges at two diametrically opposite corners, a quarter segment of a circular saw pivotally secured by a radial pivot to each of said flat edges, blocks in said notches, means connecting the ends of said saw segments with said blocks, and transverse adjusting screws for moving said blocks crosswise of said notches and adjusting the angular position of said segments.

4. In an adjustable circular dado saw, a square hub having four flat edges intersecting each other at right angles, four circular saw segments each constituting substantially a quarter of a circle, base members on each of said saw segments arranged to fit against one of the flat edges of said hub, pivots radial relative to said hub and located midway between the two ends of each of said base members for pivotally connecting each of said saw segments to said hub, the edges of said saw segments being disposed substantially in planes passing diagonally through said hub, and means connected with the ends of said saw segment base members for adjusting said base members on their pivots and holding said base members in adjusted position.

5. In an adjustable circular dado saw, a square hub having four flat edges intersecting each other at right angles and having two notches in said edges at diametrically opposite corners, four quarter segments forming a circular saw blade, base members secured to said saw segments and arranged to fit against the edges of said hub, pivots midway between the two ends of each of said base members and radial relative to said hub for pivotally securing said base members and said saw segments to said hub, a block in each of said corner notches in said hub, means connecting each of said blocks with the two adjacent ends of said saw segment base members and adjusting screws for moving said blocks crosswise within said notches to adjust the angular position of said saw segments and to hold the same in adjusted position.

6. In a dado saw, a hub, and a plurality of saw segments pivotally secured to said hub and means on said hub for adjusting said segments into different angular positions on a line that is at right angles to the axis of said hub.

7. In a dado saw, a hub, four saw segments pivotally secured to said hub, means on said hub for adjusting two of said segments into different angular positions on a line that is at right angles to the axis of said hub, and means on said hub for adjusting the other two saw segments into different angular positions on a line that is at right angles to the axis of said hub.

In witness whereof, I hereunto subscribe my name this 15th day of October A. D. 1925.

JAMES O. HENSON.